United States Patent
Dib et al.

(10) Patent No.: US 10,873,248 B2
(45) Date of Patent: Dec. 22, 2020

(54) ROTATING ELECTRICAL MACHINE INCLUDING A MAGNETIC POSITION SENSOR

(71) Applicants: IFP Energies nouvelles, Rueil-Malmaison (FR); MAVEL S.r.l., Pont Saint Martin (IT)

(72) Inventors: Wissam Dib, Suresnes (FR); Luca Favre, Valpelline (IT); Davide Bettoni, Settimo Vittone to Italy (IT)

(73) Assignees: IFP ENERGIES NOUVELLES, Rueil-Malmaison (FR); MAVEL S.R.L., Pont Saint Martim (IT)

( * ) Notice: Subject to any disclaimer, the term of this patent is extended or adjusted under 35 U.S.C. 154(b) by 32 days.

(21) Appl. No.: 16/465,480

(22) PCT Filed: Oct. 30, 2017

(86) PCT No.: PCT/EP2017/077740
§ 371 (c)(1),
(2) Date: May 30, 2019

(87) PCT Pub. No.: WO2018/099667
PCT Pub. Date: Jun. 7, 2018

(65) Prior Publication Data
US 2020/0067385 A1 Feb. 27, 2020

(30) Foreign Application Priority Data
Dec. 1, 2016 (FR) ...................................... 16 61795

(51) Int. Cl.
*H02K 11/20* (2016.01)
*H02K 11/215* (2016.01)
(Continued)

(52) U.S. Cl.
CPC ............ *H02K 11/215* (2016.01); *F16C 19/06* (2013.01); *F16C 41/007* (2013.01);
(Continued)

(58) Field of Classification Search
CPC .................................................... H02K 11/215
See application file for complete search history.

(56) References Cited

U.S. PATENT DOCUMENTS

| 7,752,943 | B2* | 7/2010 | Maruyama | H02K 7/116 74/640 |
| 8,975,793 | B2* | 3/2015 | Palfenier | H02K 1/00 310/68 B |

(Continued)

FOREIGN PATENT DOCUMENTS

| DE | 10 2008 040318 A1 | 1/2010 |
| DE | 10 2009 023691 A1 | 12/2010 |

(Continued)

OTHER PUBLICATIONS

International Search Report for PCT/EP2017/077740, dated Jun. 25, 2018; English translation submitted herewith (9 pgs.).

*Primary Examiner* — Alexander Talpalatski
(74) *Attorney, Agent, or Firm* — Fitch, Even, Tabin & Flannery LLP

(57) ABSTRACT

The invention relates to a rotary electrical machine (100) with an integral magnetic sensor (101) of the angular position of the rotor (150). The sensor includes a rotary part (108) with magnet (102) fixed to the end (160*b*) of the rotation shaft (160) at the rear of the machine, facing a fixed part (103) including Hall effect sensors and mounted on a fixed support (106) connected to the frame of the machine. The machine includes a bearing (104) centered on the axis (X), separating the rotary and fixed parts of the sensor. This bearing, fixed to the shaft and to the metal support of the fixed part of the sensor, and preferably in contact with the (Continued)

rotary part, constitutes a new mechanical reference close to the sensor. The invention provides accurate and robust position information independently of mechanical and magnetic disturbances to which the shaft may be subjected.

16 Claims, 4 Drawing Sheets

(51) Int. Cl.
*F16C 19/06* (2006.01)
*F16C 41/00* (2006.01)
*H02K 5/173* (2006.01)
*H02K 5/18* (2006.01)
*H02K 7/08* (2006.01)
*H02K 9/12* (2006.01)

(52) U.S. Cl.
CPC .............. *H02K 5/1732* (2013.01); *H02K 5/18* (2013.01); *H02K 7/083* (2013.01); *H02K 9/12* (2013.01); *F16C 2380/26* (2013.01)

(56) References Cited

U.S. PATENT DOCUMENTS

| | | |
|---|---|---|
| 2010/0012409 A1 | 1/2010 | Heidenreich et al. |
| 2013/0026888 A1* | 1/2013 | Migita ................. H02K 11/215 310/68 B |
| 2014/0021832 A1 | 1/2014 | Palfenier et al. |
| 2014/0306559 A1 | 10/2014 | Stillger et al. |
| 2016/0254731 A1 | 9/2016 | Roos |

FOREIGN PATENT DOCUMENTS

| | | |
|---|---|---|
| DE | 10 2011 053611 A1 | 3/2013 |
| DE | 10 2015 002562 A1 | 9/2016 |
| EP | 0 780 955 A1 | 6/1997 |
| FR | 1 001 845 A | 2/1952 |
| FR | 2 917 476 A1 | 12/2008 |
| GB | 782 200 A | 9/1955 |

* cited by examiner

ROTATING ELECTRICAL MACHINE INCLUDING A MAGNETIC POSITION SENSOR

CROSS REFERENCE TO RELATED APPLICATIONS

Reference is made to PCT/EP2017/077740, filed Oct. 30, 2017, and French Application No. 16/61.795 filed Dec. 1, 2016, which are incorporated herein by reference in their entirety.

BACKGROUND OF THE INVENTION

Field of the Invention

The present invention concerns rotary electrical machines and in particular the measurement of the angular position of a rotor of a rotary electrical machine.
It more particularly concerns a synchronous reluctance rotary electrical machine including an integral magnetic position sensor.

Description of the Prior Art

A rotary electrical machine conventionally includes a fixed part, the stator, and a part mobile in rotation, the rotor, which are disposed coaxially one in the other. The rotor is generally housed inside the stator, which carries electrical windings generating a magnetic field for driving the rotor in rotation. The rotor is typically formed of a body formed of a stack of laminations and placed on a rotation shaft. Those laminations comprise housings for permanent magnets or windings forming magnetic poles at the periphery of the rotor. The magnets may be visible on the surface of the rotor or completely integrated inside the rotor.

Accurate information on the position of the rotor is indispensable for controlling these machines, above all at high speeds. FIG. 1 illustrates the principle of this operation and the relations between the electrical machine 4, the algorithm 3 controlling the torque of the machine and the information 2 obtained by sensors of the voltage $U_m$, current $I_m$ and machine rotor position $p_m$. The accurate information on the position $p_m$ of the rotor of the machine 4 is conventionally used by an algorithm 3 for vector control of the torque of the machine. This is generally referred to as vector control because in order for the machine 4 to produce the torque required by the target application the electrical currents circulating therein must be kept in phase and synchronized with the position of the rotor. In order to achieve this, the microcontroller 1 of the machine, which is integrated into the inverter controlling the machine, controls the machine by applying voltages $U_a$ to the terminals of the machine 4 which are supplied by the torque control algorithm 3.

Various ways are known for obtaining the angular position of the rotor of a rotary electrical machine. A first way estimates the angular position entirely by software and a second way determines the angular position using position sensors. Using position sensors provides more accurate information. Some rotary electrical machines, such as synchronous reluctance machines, including few magnets, necessitate very accurate information on the position of the rotor. The measurement must typically be accurate to within less than one electrical degree, above all at high speeds, given that one electrical degree is equal to one mechanical degree multiplied by the number of pairs of poles. More generally, the highest possible accuracy is generally desired to enable robust and reliable control of the machine.

A number of known types of position sensors can be used, including "resolver" type sensors that generally supply an accurate measurement but are costly and may necessitate adaptation of how the inverter is controlled. Other types of sensors such as magnetic sensors, which are less costly, or incremental sensors may be used.

FIG. 2 shows a standard magnetic position sensor having an operating principle identical to that used in the machine according to the invention. The position sensor 10 comprises two parts which are a rotary part 11 including a magnet, having rotational movement shown by arrows 11, and a fixed part 12 including a plurality of Hall effect magnetic sensors. The rotary part is fastened to the shaft of the rotor of the machine, and the magnet is generally being integrated into the shaft. The Hall effect magnetic sensors of the fixed part 12 detect the amplitude of the rotating magnetic field produced by the magnet rotating with the shaft, which makes it possible to generate output signals giving the position of the magnet and therefore the angular position of the rotor. The cable 13 is used to send the electrical signals generated by the position sensor 10. A sensor of this kind is powered by a DC voltage, for example a DC voltage Vdd of 5 volts ±5%. The sensor produces two output signals which are the sine and the cosine of the angular position of the rotor. These signals $V_A$ and $V_B$ are typically of sinusoidal form and are offset by 90°. Accordingly, to control the electrical machine these two signals are used and conditioned in the microcontroller used to control the machine.

The radial distance between the magnet fixed to the shaft and the magnetic sensors of the fixed part impacts greatly the amplitude of the output signals and the accuracy of the measurement.

The above position sensor topology has a number of advantages:
  a low cost in relation to the accuracy of the position measurement that this sensor can produce;
  a high "IP" protection index as per the standard EN 60529, typically a protection index IP67; and
  easy installation.

On the other hand, position sensors of this kind are very sensitive to radial and axial movements of the magnet of the rotary part relative to the fixed part including the magnetic sensors. By axial movement is meant a movement in the direction defined by the axis (X) around which the shaft of the rotor rotates and by radial movement is meant a movement perpendicular to the axis (X). These movements can result for example from cumulative mechanical tolerances, thermal effects (for example expansion of the iron), the mechanical tolerance of the support of the magnet (movement of the hole in the shaft). The cumulative mechanical tolerance is linked to the presence of intermediate parts between the position sensor and the mechanical reference conventionally adopted, which is the bearing supporting the rotation shaft, notably the presence of rotary intermediate parts such as a fan mounted on the shaft to cool the machine. Any intermediate part between the position sensor and the bearing supporting the rotation shaft (at the rear end of the machine) makes it difficult to maintain a strict cumulative tolerance for the various mechanical parts, in particular for the position sensor. A strict tolerance is important for guaranteeing an accurate measurement of the rotor by the magnetic position sensor.

Furthermore, the output signal, in particular the (peak to peak) amplitude of the signal, can be disturbed by the induced magnetic field of the machine and magnetization of the shaft on which the magnet is mounted. The support of the magnet is normally amagnetic, which makes it possible on the one hand to protect the magnet from the magnetic field lines coming from the stator and on the other hand to maintain the concentration of the field of the magnet. However, there are generally always leakage field lines, above all at high currents, that cannot be filtered by the support. If the shaft is magnetized, there is a risk of the magnet of the position sensor becoming demagnetized over time, and magnetic field lines can also be generated in the stator. All of this then can disturb the operation of the magnetic position sensor and therefore the measurement.

SUMMARY OF THE INVENTION

The present invention relates to a rotary electrical machine including a magnetic position sensor for determining the angular position of the rotor.

The present invention overcomes the disadvantages of the prior art mentioned above and provides a rotary electrical machine with an integral sensor of the angular position of the rotor that is able to provide robust and accurate information on the position of the rotor independently of mechanical and/or magnetic disturbances which are liable to occur on the shaft of the motor.

In particular, the present invention provides information on the position of the rotor at the same time as ensuring at least one of easy integration of the position sensor and protection in relation to the high level of sealing of the sensor, with typically a protection index IP67 as per the standard EN 60529, in order to be compatible with requirements relating to at least one of the sealing of the electrical machine, and limiting economical cost for the measurement of the position of the rotor.

Accordingly, to achieve at least one of the above objectives, among others, the present invention is a rotary electric machine including:
  a stator disposed in a frame, including windings;
  a rotor including a body fixed to a rotatably mounted shaft in the stator and rotating about an axis (X);
  a first bearing supporting an end of the shaft driving a load;
  a second bearing supporting an end of the shaft opposite the end driving the load;
  a front flange disposed at a first end of the frame and including a first housing in a median part to receive the first bearing;
  a rear flange disposed at a second end of the frame opposite the first end and including a second housing in a median part to receive the second bearing; the front and rear flanges each having an internal face and an external face;
  a magnetic position sensor for measuring the angular position of the rotor during rotation of the shaft, the position sensor including:
  a rotary part comprising a magnet fixed to the end of the rotatably mounted shaft opposite the end driving the load so as to be constrained to rotate with the rotatably mounted shaft during rotation of the rotatably mounted shaft;
  a fixed part including Hall effect sensors and means for transmitting sensor output signals, the fixed part facing the rotary part and being mounted on a fixed metal support connected to the frame of the machine;
the rotary part and the fixed part of the position sensor being separated by a third bearing centered on the axis (X), the third bearing being fixed on the one hand to the end of the rotatably mounted shaft opposite the end driving the load and on the other hand to the walls of an opening formed in the metal support which allow passing of the end of the rotatably mounted shaft including the rotary part of the sensor.

According to one embodiment of the invention, the third bearing is in contact with the rotary part of the position sensor.

According to one embodiment, the rotary part of the position sensor includes an insert housed in a cavity formed at the end of the rotatably mounted shaft opposite the end driving the load, the cavity including an opening toward an exterior of the machine, the insert being provided on a side of the opening of the cavity with the position sensor magnet.

The insert of the rotary part of the position sensor is preferably made of an nonmagnetic material, which is preferably an nonmagnetic steel or brass.

The third bearing is preferably formed of a ferromagnetic material, preferably a ferromagnetic steel.

The third bearing may be of the type with rolling members, preferably balls, and preferably includes an external race fixed to the walls of the opening of the metal support and internal race fixed to the end of the rotation shaft opposite the end driving the load and in contact with the rotary part of the sensor.

The fixed metal support of the fixed part of the sensor preferably has an internal face facing toward the rear flange and an external face oriented toward the exterior of the machine, the external face including a plane surface at the periphery of the opening of the metal support, the plane surface being in contact with the fixed part of the position sensor.

According to one embodiment, the machine further includes a cooling system including external cooling means for cooling the frame and the front and rear flanges, the external cooling means including an external fan fastened to the rotatably mounted shaft and disposed between the external face of the rear flange and the third bearing to direct outside air along the frame in the direction of the front flange.

The frame advantageously has an external surface including a set of cooling fins elongated substantially along an axis parallel to the axis (X) of the rotatably mounted shaft and the rear flange advantageously has a central part which is a ring connected to a cylindrical peripheral part and at least one opening disposed between the central part and the peripheral part of the rear flange to direct outside air from the external fan into the passages formed by the set of cooling fins on the external surface of the frame.

The external fan preferably includes an outside air impellor mounted on the rotation shaft between the external face of the rear flange and the third bearing and the fixed metal support for the position sensor is connected to the frame by being fixed to a protection plate covering the external fan, the protection plate including orifices for entry of the outside air and being fixed to the peripheral part of the rear flange.

The frame and the front and rear flanges preferably form a sealed casing and the cooling system preferably further includes a pair of internal fans disposed inside the frame to create a flow of air inside the frame when the rotor rotates, each fan being fixedly mounted on the rotation shaft between the body of the rotor and a bearing and the internal face of each of the front and rear flanges including fins arranged on a peripheral part of the first and second housings of the flanges to orient the flow of air and to capture the heat of said flow of air.

The magnetic position sensor integral with the machine advantageously has a protection index IP67 as per European standard EN 60529.

The electrical machine according to the invention preferably has a power rating between 20 kW and 75 kW inclusive.

The electrical machine according to the invention is preferably of the synchronous reluctance type.

Other objects and advantages of the invention will become apparent on reading the following description of particular embodiments of the invention given by way of nonlimiting example and with reference to the appended figures, described below.

Figure 1:
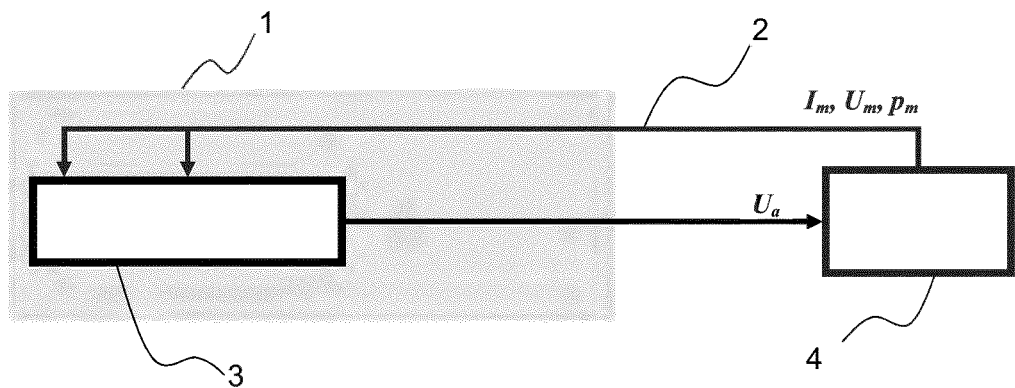
FIG. 1, already described above, is a theoretical diagram showing the use of the information on the position of the rotor for motor control in an electrical machine.
Figure 2:
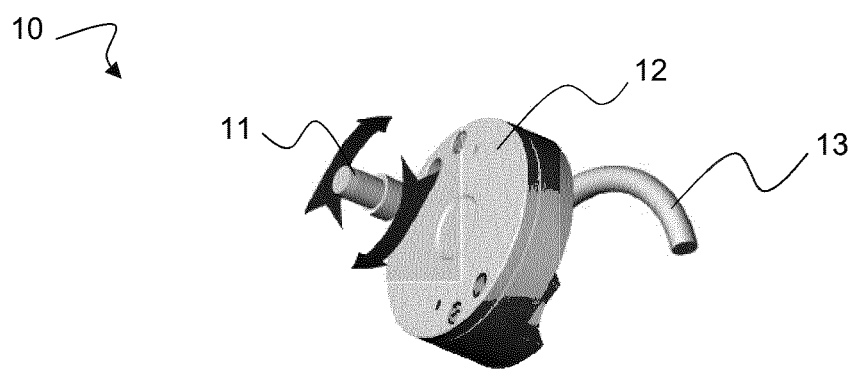
FIG. 2, already described above, is a perspective view of one example of a standard magnetic position sensor of the same type as the position sensor that can be used in an electrical machine according to the invention.

In the figures, the same references designate identical or analogous elements.

DETAILED DESCRIPTION OF THE INVENTION

The subject matter of the invention relates to a rotary electrical machine with an integral magnetic sensor for sensing the angular position of the rotor.

FIGS. 3 to 7 are various sectional views of a rotary electrical machine according to one embodiment of the invention that can be used as a traction electric motor in an electric or hybrid vehicle.

A motor, as shown in FIGS. 3 to 7, is a synchronous reluctance motor, for example, also known as a synchro-reluctant motor, with a continuous power rating of 35 kW and a transient (peak) power rating of 52 kW and is capable of operating with a supply voltage on a DC bus at 350 V.

Although advantageously applying to synchronous reluctance electrical machines, the present invention is not limited to that electrical machine topology and more broadly concerns any type of electrical machine and in particular electrical machines having a power rating of which is between 20 kW and 180 kW inclusive. To be more specific, the electrical machines shown in FIGS. 3 to 7 including a dedicated cooling system that notably includes external (frame and flanges) cooling by ventilation with air can typically have a power rating between 20 and 75 kW inclusive. Above 75 kW, the electrical machines preferably include other, external cooling, for example for cooling by circulation of a liquid.

The electric motor 100 includes a frame 130 closed at one end by a front flange 110 and the other end by a rear flange 120. The stator 190 with its windings and the rotor 150 of the electric motor are contained within the frame 130. A terminal box (no reference in the figures) in which the connections are effected is fixed to the frame 130, in particular at the level of the flange 110 that closes the frame at the front of the motor. The frame 130 and the flanges 110 and 120 are made of metal, for example aluminium or iron. Without this being shown, the frame can be made in one piece with one of the flanges or each flange can form a unitary component with a part of the frame, the two components then being joined together to form a housing containing the stator and the rotor.

The rotor 150 includes a body fixed to the rotatably mounted shaft 160 rotatably mounted in the stator. The rotatably mounted shaft 160, rotating about the axis (X), is carried by the front flange 110 and the rear flange 120. The front flange 110 supports the end 160a of the rotatably mounted shaft 160 driving the load and the rear flange 120 supports the end 160b of the rotation shaft 160 opposite the end driving the load.

In the remainder of the description, by the front of the machine is meant the side of the machine on which a load is driven by the rotatably mounted shaft of the rotor and by the rear of the machine is meant the opposite side.

To be more specific, the front flange 110 and the rear flange 120 each have an internal face (111, 121) oriented toward the interior of the machine, an external face (112, 122) oriented toward the exterior of the machine, and a housing (116a, 126a) positioned in a median part of the internal face (111, 121) to receive a bearing (171, 172). The bearings 171 and 172, which are for example ball bearings, respectively support the end 160a of the rotation shaft 160 driving a load and the end 160b of the rotation shaft opposite the end driving the load.

Figure 3:
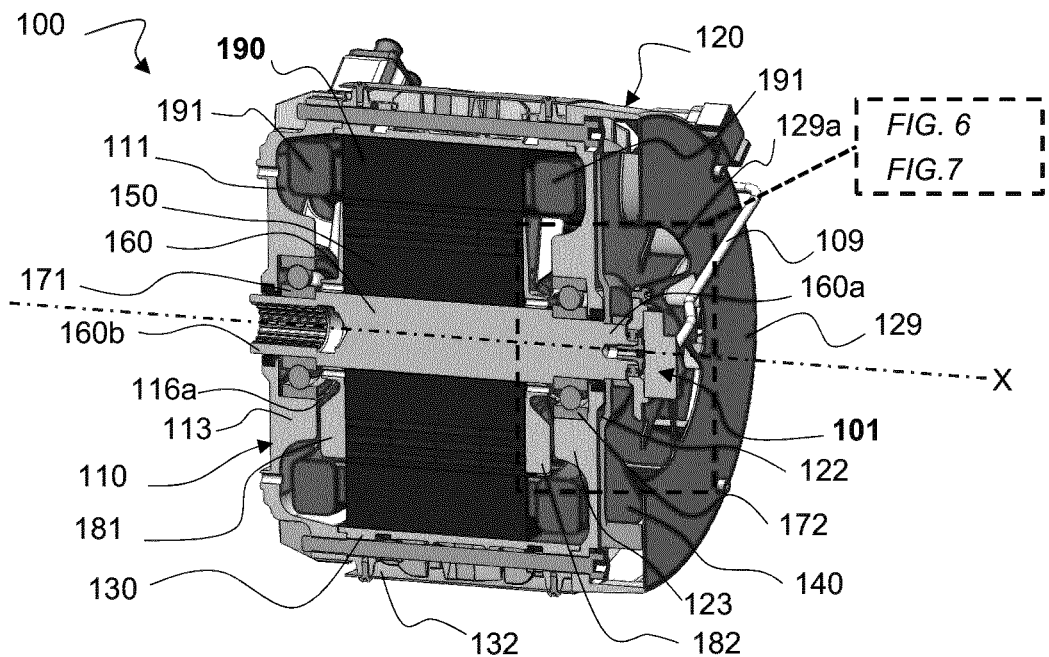
FIG. 3 is a cutaway perspective view of the rear part of an electrical machine according to one embodiment of the invention.
Figure 4:
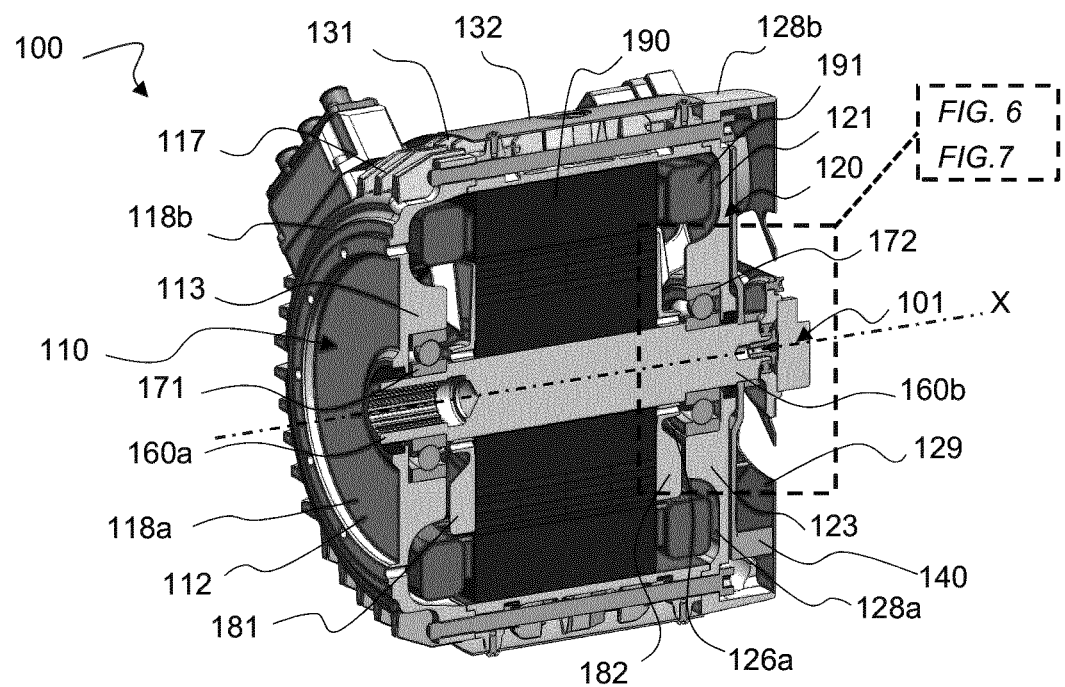
FIG. 4 is a cutaway perspective view of the front part of an electrical machine according to that same embodiment of the invention.
Figure 5:
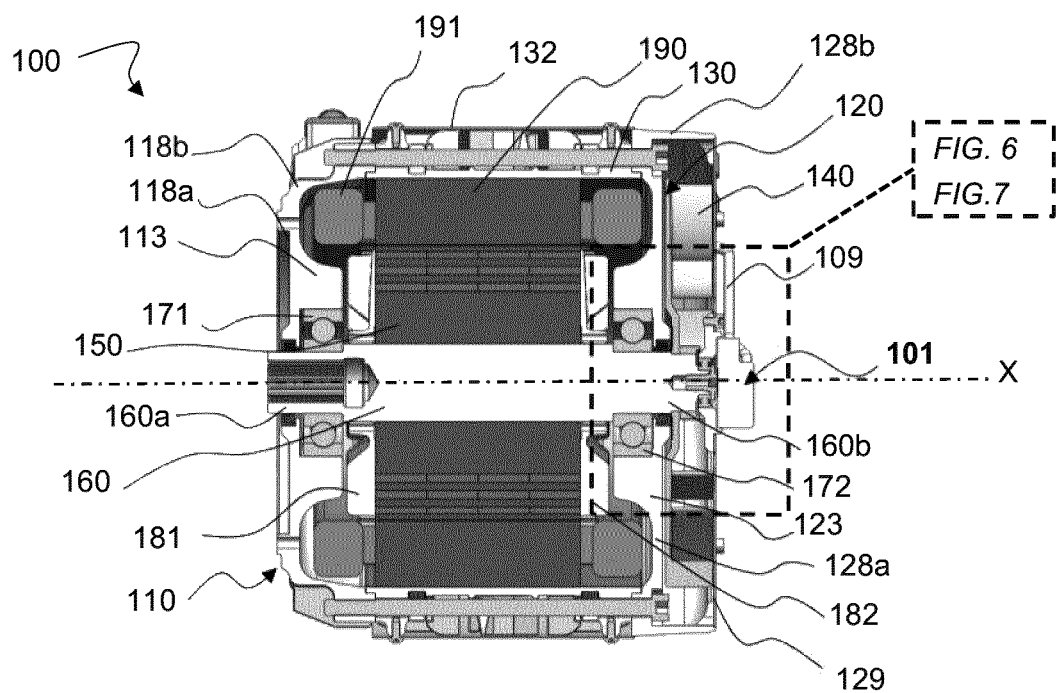
FIG. 5 is a view in longitudinal section of an electrical machine according to that same embodiment of the invention.
Figure 6:
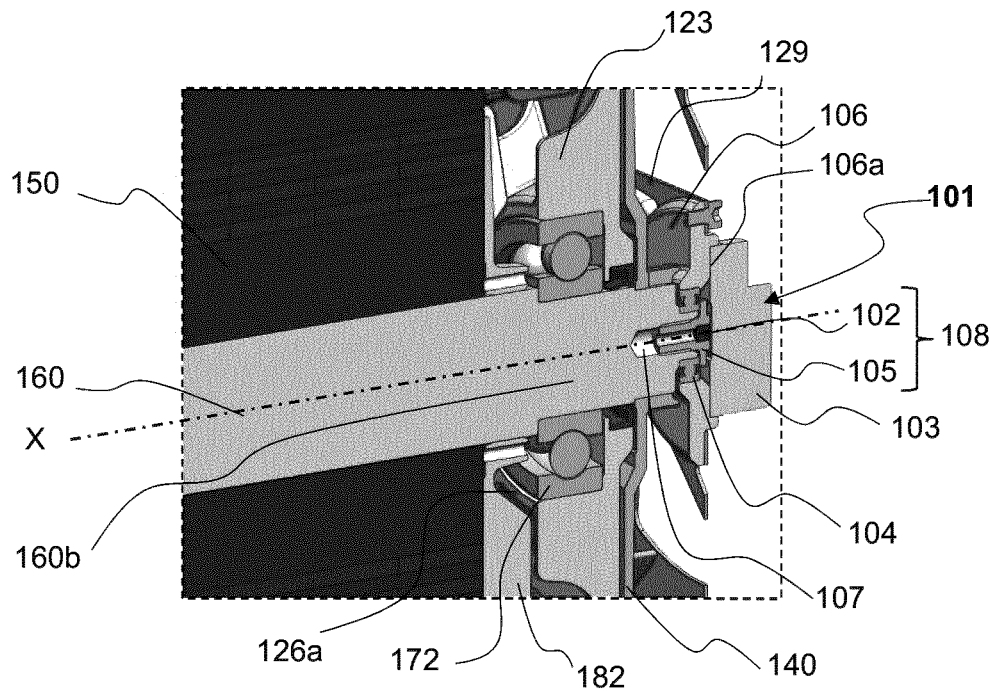
FIG. 6 is a detail of the view from FIG. 4 centered on the integration of the rotor position sensor into the electrical machine according to the invention.
Figure 7:
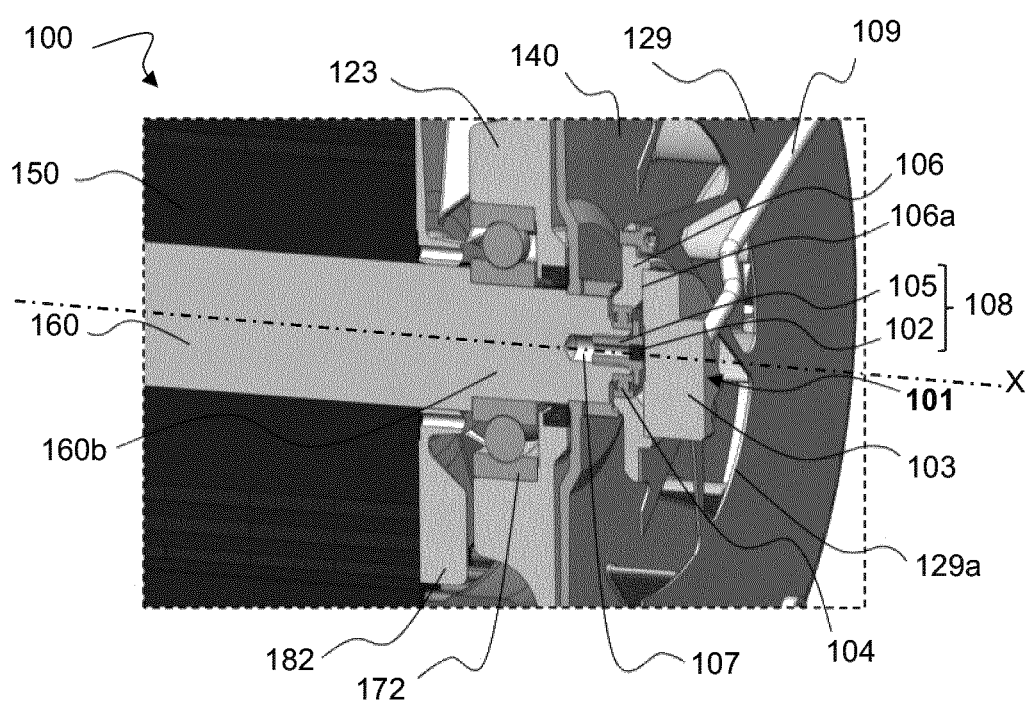
FIG. 7 is a detailed view from FIG. 3 centered on the integration of the rotor position sensor into the electrical machine according to the invention.

According to the invention, the electrical machine includes a magnetic position sensor 101 for measuring the angular position of the rotor during the rotation of the shaft. The position sensor 101 and its integration into the electrical machine are seen particularly clearly in FIGS. 6 and 7, which are respectively details of the rear part of the machine as shown in FIGS. 4 and 3.

The position sensor includes:
- a rotary part 108 comprising a magnet 102 fixed to the end 160b of the rotatably mounted shaft 160 to be constrained to rotate with the shaft;
- a fixed part 103 including Hall effect sensors and means for transmitting the output signals of the sensor 109. The fixed part 103 faces the rotary part 108 and is mounted on a fixed metal support 106 connected to the frame 130 of the machine 100. The Hall effect sensors can conventionally be regularly distributed over 360 mechanical degrees. For example, if the fixed part 103 includes three Hall effect sensors the latter are positioned 120 degrees apart.

According to the invention, the rotary part 108 and the fixed part 103 of the position sensor 101 are separated by a bearing 104. This bearing 104 is centered on the rotation axis (X) of the shaft. It is fixed on the one hand to the end 160b of the shaft 160 and on the other hand to the walls of an opening formed in the metal support 106. The opening allows to passage through it at the end of the rotation shaft 160 carrying the rotary part of the sensor.

The bearing 104 is preferably in contact with the rotary part of the sensor, which increases the mechanical robustness and the mechanical precision of this specific assembly.

According to the invention, this bearing 104 constitutes a new mechanical reference for the parts that can be mounted on the shaft, replacing the usual reference, namely the bearing 172, notably for the parts of the position sensor. Because of its proximity to the shaft position sensor, this new reference makes it possible to ensure a low tolerance (greater accuracy) of the radial and axial position of the position sensor and a constant and precise distance between the magnet and the sensor. Consequently, the assembly formed by this bearing 104 and the position sensor enables robust and accurate information on the position of the rotor to be measured by the sensor 101, independently of any mechanical disturbance that could intervene, for example because of the presence of other mechanical parts mounted on the shaft, such as an external fan as described hereinafter.

This configuration of the bearing 104 and the position sensor 101 also has the effect of closing the induction of the magnetic field lines that may be created by magnetization of the shaft, if it is made of a ferromagnetic material. Because of this, the magnet of the sensor is isolated from any magnetic disturbance induced by magnetization of the rotor, which would compromise the measurement of the position of the rotor. The invention therefore limits the risk of demagnetization over time of the position sensor.

The position of the rotating shaft is measured by detecting the magnetic field variation linked to the rotation of the magnet 102 fastened to the shaft 160. The operating principle of a magnetic position sensor of the Hall effect device type is well known to the person skilled in the art and is not described here. The output signals of the sensor are sent to the microcontroller integrated into the inverter controlling the motor by the means, typically cables, for transmitting the output signals of the sensor 109.

The magnetic position sensor 101 preferably has a protection index of IP67 as per the European standard EN 60529 relating to sealing. This index IP classifies the level of protection that equipment offers to intrusion of solid bodies and liquids. The format of the index, given by the standard IEC 60529, is "IP" followed by two digits and/or a letter. The first digit relates to the protection against dust and the second digit relates to the protection against the ingress of water. An object with index IP 67 is totally protected against dust and against the effects of temporary immersion (up to 1 m), the penetration of water in harmful quantities being impossible if the equipment is immersed in water under defined conditions of pressure and time (up to 1 m submersion).

The rotary part 108 of the sensor 101 preferably includes an insert 105 equipped with the magnet 102. The insert 105 is housed in a cavity 107 formed at the end 160*b* of the shaft 160. This cavity 107 includes an opening toward the outside of the machine. The magnet 102 is positioned in the insert 105 on the side of this opening. It has been possible to produce a cavity of this kind by drilling the end 160*b* of the shaft. The insert 105 is for example fixed to the shaft 160 by screwthreads.

The insert 105 of the rotary part 108 of the position sensor 101 is preferably made of nonmagnetic material such as nonmagnetic steel or brass. This composition contributes to protecting the magnet from the magnetic field lines from the stator and to maintaining the concentration of the field specific to the magnet.

The bearing 104 is preferably made of a ferromagnetic material, for example a ferromagnetic steel. It is therefore able to close the leakage field lines.

The bearing is advantageously of the type with rolling members, typically balls, although equally well rollers. The bearing can therefore comprise an external race fixed to the walls of the central opening of the metal support 106 and an internal race fixed to the end 160*b* of the shaft 160 and in contact with the rotary part 108 of the sensor, in particular in contact with a part of the insert 105 outside the cavity 107.

The fixed metal support 106 of the fixed part 103 of the sensor 101 has an internal face that faces the rear flange 120 and an external face oriented toward the exterior of the machine. The external face of the support 106 has a plane surface 106*a* at the periphery of the opening in the metal support, the plane surface being in contact with the fixed part 103 of the position sensor. To be more specific, the external face of the metal support 106 includes an annular housing receiving the fixed part 103 of the sensor. The annular housing includes the plane surface 106*a*, which is situated at the periphery of the opening for the end of the shaft including the magnet of the position sensor. The fixed metal support 106 can take the form of a disk, as shown in FIGS. 3 to 7, or be any other shape.

The present invention advantageously applies to an electrical machine that includes a cooling system including external cooling means for cooling the frame and the front and rear flanges, typically an external fan at the rear of the machine and mounted on the rotation shaft.

According to the embodiment of the invention shown in FIGS. 3 to 7, the external cooling means include an external fan 140 fastened to the rotation shaft 160 and disposed between the external face 122 of the rear flange 120 and the bearing 104 of the position sensor which directs outside air along the frame 130 in the direction of the front flange 110.

The presence of the bearing 104 in the machine according to the invention provides a new mechanical reference that is positioned after the fan 140 (toward the exterior of the machine along the axis X), that is to say between the fan 140 and the position sensor 101. This new mechanical reference near the position sensor therefore makes possible a low tolerance with respect of the radial and axial position of the position sensor and a constant and precise distance between the magnet and the sensor. A configuration of this kind is favorable to accurate output signals of the sensor that are free of interference, that is to say notably including few harmonics, and therefore easily exploitable.

According to the embodiment of the invention shown in FIGS. 3 to 7, the frame 130 has an external surface including a set of elongate cooling fins 131 extending substantially along an axis parallel to the axis (X) of the rotation shaft 160. The rear flange 120 includes a central part 128*a* in the form of a ring connected to a cylindrical peripheral part 128*b* and at least one opening 127 between the central part 128*a* and the peripheral part 128*b* of the rear flange 120 to direct outside air from the external fan 140 into passages formed by the set of cooling fins 131 on the external surface of the frame 130.

The external fan 140 preferably includes an outside air impellor mounted on the rotation shaft 160 between the external face 122 of the rear flange 120 and the bearing 104 of the position sensor.

A protection plate 129 is positioned at the rear of the motor, covering the external fan 140. The protection plate 129 is fixed to the peripheral part 128*b* of the rear flange 120. The protection plate 129 includes orifices 129*a* for entry of outside air aspirated by the impellor of the fan 140.

The fixed metal support 106 for the position sensor 101 is connected to the frame by fixing it to this protection plate 129, for example.

The present invention may equally be applied to an electrical machine including external cooling means including a cooling liquid circuit for cooling the frame and the front and rear flanges.

The system for cooling the electrical machine according to the invention preferably further includes two internal fans (181, 182) fixedly mounted on the shaft 160 of the rotor 150 at the two ends of the rotor, each facing the internal face of a flange (110, 120) including fins (113, 123) adapted to orient the flow of air created by internal fans and to capture its heat.

In this case, the electrical machine with an integral cooling system of this kind including the pair of internal fans is a closed rotary electrical machine. A detailed description of this particular embodiment including an internal cooling system is given hereinafter.

By closed electrical machine is meant an electrical machine having the rotor and the stator enclosed in a sealed frame that may also be referred to as a casing.

In the embodiment of the invention shown in FIGS. 3 to 7, the frame, which contains the rotor and the stator of the electrical machine, is closed in sealed manner by the two flanges 110 and 120. The front flange 110 and the rear flange 120 in fact include sealing means for closing the frame 130 in a sealed manner.

The front flange 110 includes a central part 118a in the form of a ring and a peripheral part 118b of cylindrical shape. The internal face 111, facing toward the interior of the frame 130, includes a housing 116a positioned in the median part of the internal face intended to receive the bearing 171. This housing 116a has at its center an orifice for the rotation shaft 160 of the rotor to pass through. Seals are provided at the level of the orifice for the shaft 160 and on the perimeter of the peripheral part 118b intended to come into contact with the frame 130. The peripheral part 118b of the flange 110 also includes fixing points for fixing the front flange 110 to the frame 130.

The internal face 111 of the front flange 110 includes a set of fins 113 arranged on the periphery of the housing 116a of the bearing 171. The function of these fins 113 is to orient the flow of air created by the rotation of an internal fan 181 placed between the bearing 171 and the rotor 150, as described hereinafter, and to capture the heat of that flow of air. The internal face 111 of the front flange 110 carries twelve fins 113, for example.

The fins 113 are preferably regularly distributed around the housing 116a. The fins and the body of the flange preferably form a single (monobloc) entity, for example manufactured using a mould. The fins advantageously have a shape such that they contribute to a specific circulation of the internal air that effectively cools the winding heads and the rotary part of the machine. Each fin is preferably plane and has the general shape of a trapezium with the bases (parallel opposite sides) being orthogonal to the axis (X) and the side opposite the housing 116a is not straight but rather curved, having a concavity (relative to a point situated at the periphery 118b of the flange radially in line with the fin). This concavity of the edge of the fin makes it possible to provide optimum proximity with the winding heads at the same time as ensuring an optimum flow of air for effective cooling. This description of the fins is based on the parts visible at the surface of the flange (and on the basis of a section of the flange). In longitudinal section through the fin, the latter has the general shape of a rectangular trapezium having a side forming a right angle with the bases constituting the wall of the housing 116. The internal fins have a bird's wing shape with a scapular part facing the internal face of the flange. The dimensions of the fins are such that a maximum space is left between the internal fan and the top part of the fins facing the internal fan so as to maintain proximity to the internal fan appropriate for good circulation of air in the free space left between the flange and the internal elements of the machine. By way of nonlimiting example, a space of 4 to 5 mm is left between the internal fan and the tops of the fins in a device including flanges of approximately 20 cm inside diameter carrying internal fins approximately 20 mm long. The length (or height) of the fins is understood as the dimension of the fins along the axis (X).

The peripheral part 118b of the front flange 110 may additionally include heat dissipating fins 117 on its external face 112. The dissipating fins 117 are elongated substantially along an axis parallel to the axis (X) of the rotor. If the frame 130 has an external surface including a set of cooling fins 131, the fins 117 of the front flange 110 then extend the passages formed by the cooling fins 131 of the frame 130.

The rear flange 120 includes a central part 128a which is a ring connected to a cylindrical peripheral part 128b. As in the case of the front flange 110, the internal face 121, facing toward the interior of the frame 130, includes a housing 126a positioned in the median part of the internal face intended to receive the bearing 172. This housing 126a has at its center an orifice for the rotation shaft 160 of the rotor to pass through. Seals are provided at the level of the orifice for the shaft 160 and at the perimeter of the central part 128b intended to come into contact with the frame 130. The peripheral part 128b and the central part 128a of the rear flange 120 include connections that also comprise fixing points for fixing the flange to the frame. For example, the rear flange includes four connections with four fixing points (screwholes, for example).

The internal face 121 of the rear flange 120 includes, like the front flange 110, a set of fins 123 arranged at the periphery of the housing 126a of the bearing 172. These fins 123 have the same function of orienting the flow of air created by the rotation of an internal fan 182 placed between the bearing 172 and the rotor 150 and of capturing the heat of that flow of air. The internal face 121 of the rear flange 120 carries twelve fins 123, for example.

The fins 123 are preferably regularly distributed around the housing 126a. Their shape and their dimensions are preferably identical to those of the fins 113 on the internal face 111 of the front flange 110 described above.

The rear flange 120 includes at least one opening between the central part 128a and the peripheral part 128b for directing outside air from the external fan 140 along the frame 130, notably to direct that air into passages formed by the set of cooling fins 131 on the external surface of the frame 130. The rear flange 120 includes for example four openings of this type. These openings have a circular arc shape, for example, and are uniformly distributed at the perimeter of the central part 128a of the flange 120.

The cooling fins 131 on the external surface of the frame 130 are elongated along an axis substantially parallel to the axis (X) of the rotor. By substantially parallel to the axis (X) is meant to within an angle of plus or minus 25° relative to that axis (X). The role of these cooling fins 131 is to increase the area of exchange of the frame with the air for a greater dissipation of heat and to direct the flow of outside air on the surface of the frame to cover the entire length of the frame from one flange to the other. A continuous passage for the flow of outside air is created if the peripheral part of the front flange 110 also includes dissipating fins 117, preferably oriented in the same direction as the cooling fins of the frame 130, thereby improving the cooling of the frame and of the front flange.

In the description, outside air means air outside the closed rotary electrical machine and inside means air contained in the closed electrical machine, to be more precise air enclosed in the sealed frame of the machine.

The electric motor can further include metal, preferably aluminium plates 132 mounted on the frame 130 and surrounding the cooling fins 131 to retain air in the vicinity of the external surface of the frame 130 and the cooling fins 131 as it flows along the frame. In the motor example shown in FIGS. 3 to 7, the metal plates 132 are slightly curved so as to follow the shape of the exterior surface of the frame. The metal plates 132 are preferably regularly distributed around the frame; for example eight plates are fixed to the frame, grouped two by two to form units spaced around the frame. The metal plates 132 are mounted on the frame to provide a passage for the flow of outside air from the external fan 140. The metal plates 132 can therefore rest on the peripheral part of the rear flange 120.

The pair of internal fans (181, 182) inside the frame makes it possible to create a flow of air inside the frame when the rotor rotates. A flow of air inside the sealed frame is caused by the interaction between the internal fans 181 and 182 when operating and the structural elements of the machine inside the frame 130, notably the structure of the internal faces of the flanges 110 and 120. To be more specific, the fins (113, 123) on the internal face (111, 121) of the front and rear flanges (110, 120) direct the flow of air created by each internal fan (181, 182) radially toward the heads 191 of the windings of the stator 190 (flow in a direction that is centrifugal around the axis (X) of the rotation shaft 160), and then to return the flow of air from the winding heads 191 toward the center of the flange, first in a direction parallel to the axis (X) at the level of the winding heads and then radially toward the rotation shaft (flow parallel to the axis (X) and then in a centripetal direction around the axis (X)). This kind of internal circulation of air is therefore produced on the front side and the rear side of the motor, on either side of the rotor 150. In addition to orienting the internal flow of air, the fins on the internal faces of the flanges 113 and 123 make it possible to dissipate the heat of the flow of air and therefore to cool the winding heads 191 of the stator 190 as well as the shaft 160 and the rotor 150 of the electrical machine.

The external fan 140 positioned at the rear of the motor between the external face of the rear flange 120 and the bearing 104 contributes to the cooling of the frame 130 and the flanges by the generation of an external flow of air that is first directed radially toward the periphery of the external face of the rear flange 120 and is then directed toward the front flange 110 parallel to the rotation axis (X) and extending along the exterior surface of the frame 130 preferably provided with the cooling fins 131 and preferably surmounted by the metal plates 132 that confine the flow of air on the exterior surface of the frame 130. The air therefore preferably passes in the passages formed between the elongate fins substantially along the axis (X), being confined to the space formed between the metal plates and the exterior surface of the frame 130. The openings 127 in the rear flange 120 advantageously allow the passage of outside air from the fan 140 from the external face of the flange toward the exterior surface of the frame 130 preferably provided with the cooling fins 131.

The external fan 140 is larger than the internal fans 181 and 182. The size of the fan 140 is chosen as a function of the power of the motor and the maximum rotation speed so as to ensure optimum cooling.

The present invention advantageously applies to synchronous reluctance motors and preferably to machines having a power between 20 kW and 180 kW inclusive. By way of nonlimiting example, the motor cooled in accordance with the invention can be a synchronous reluctance motor with a continuous power rating of 30 kW and a transient (peak) power rating of 52 kW, which operates with a DC bus supply voltage of 350 V and have the following dimensions: outside diameter of the rotor 134 mm, outside diameter of the stator 200 mm, outside diameter of the frame 250 mm, length of the motor 214 mm, length of the active part (corresponding to the length of the stack of laminations of the rotor) 100 mm.

The invention claimed is:

1. A rotary electric machine including:
   a stator disposed in a frame, including windings;
   a rotor including a body fixed to a rotatably mounted shaft rotatably mounted in the stator to rotate about an axis;
   a first bearing supporting an end of the rotatably mounted shaft driving a load;
   a second bearing supporting an end of the rotatably mounted shaft opposite the end driving the load;
   a front flange disposed at a first end of the frame and including a first housing in a median part thereof for receiving the first bearing;
   a rear flange disposed at a second end of the frame opposite the first end and including a second housing in a median part for receiving the second bearing;
   the front and rear flanges each having an internal face and an external face,
   a magnetic position sensor for measuring the angular position of the rotor during rotation of the rotatably mounted shaft, the position sensor including:
      a rotary part comprising a magnet fixed to the end of the rotatably mounted shaft opposite the end driving the load which rotates with the rotatably mounted shaft during the rotation of the rotatably mounted shaft;
      a fixed part including Hall effect sensors and means for transmitting output signals from the sensors, the fixed part facing the rotary part and being mounted on a fixed metal support connected to the frame of the machine;
   the rotary part and the fixed part of the position sensor being separated by a third bearing centered on the axis, the third bearing being fixed on the end of the rotatably mounted shaft opposite the end driving the load and to walls of an opening formed in the fixed metal support adapted for passing the end of the rotatably mounted shaft including the rotary part.

2. An electrical machine according to claim 1, wherein the third bearing contacts the rotary part.

3. An electrical machine according to claim 1, wherein the rotary part includes an insert housed in a cavity formed at the end of the rotatably mounted shaft opposite the end driving the load, the cavity including an opening toward an exterior of the machine, the insert being on a side of the opening of the cavity formed at the end of the rotatably mounted shaft.

4. An electrical machine according to claim 2, wherein the rotary part includes an insert housed in a cavity formed at the end of the rotatably mounted shaft opposite the end driving the load, the cavity including an opening toward an exterior of the machine, the insert being on a side of the opening of the cavity formed at the end of the rotatably mounted shaft.

5. An electrical machine according to claim 3, wherein the insert of the rotary part of the position sensor is made of nonmagnetic material.

6. An electrical machine according to claim 4, wherein the insert of the rotary part of the position sensor is made of nonmagnetic material.

7. An electrical machine according to claim 1, wherein the third bearing is formed of a ferromagnetic material.

8. An electrical machine according to claim 1, wherein the third bearing comprises rolling members, an external race fixed to the walls of the opening of the metal support and an internal race fixed to the end of the rotation shaft opposite the driving end and in contact with the rotary part of the sensor.

9. An electrical machine according to claim 1, wherein the fixed metal support of the fixed part of the sensor has an internal face facing toward the rear flange and an external face oriented toward the exterior of the machine, the external face including a plane surface at a periphery of the opening of the metal support, which is in contact with the fixed part of the position sensor.

10. An electrical machine according to claim 1, comprising a cooling system providing external cooling for cooling the frame and the front and rear flanges, the external cooling including an external fan fastened to the rotatably mounted shaft and disposed between the external face of the rear flange and the third bearing direct outside air along the frame in a direction of the front flange.

11. An electrical machine according to claim 10, wherein:
the frame has an external surface including cooling fins elongated along an axis parallel to the axis of the rotation shaft; and
the rear flange has a central ring connected to a cylindrical peripheral part and at least one opening disposed between the central ring and the peripheral part of the rear flange to direct the outside air from the external fan into the passages formed by the cooling fins on an external surface of the frame.

12. An electrical machine according to claim 10, in which the external fan includes an outside air impellor mounted on the rotatably mounted shaft between the external face of the rear flange and the third bearing and in which the fixed metal support is connected to the frame by being fixed to a protection plate covering the external fan, the protection plate including orifices for entry of the outside air and being fixed to the peripheral part of the rear flange.

13. An electrical machine according to claim 12, wherein the frame and the front and rear flanges form a sealed casing and in which the cooling system further includes a pair of internal fans disposed inside the frame to create a flow of air inside the frame when the rotor rotates, each fan being fixedly mounted on the rotatably mounted shaft between a body of the rotor and a bearing and an internal face of each of the front and rear flanges includes fins on a peripheral part of first and second housings of the flanges to orient the flow of air and to capture heat of the flow of air.

14. An electrical machine according to claim 1, wherein the magnetic position sensor integral with the machine has a protection index IP67 in accordance with European standard EN 60529.

15. An electrical machine according to claim 1 having an inclusive power rating between 20 kW and 75 kW.

16. An electrical machine according to claim 1 wherein the electrical machine is a synchronous reluctance electrical machine.

* * * * *